United States Patent [19]

Quist, Jr. et al.

[11] Patent Number: 4,556,924
[45] Date of Patent: Dec. 3, 1985

[54] DISK DRIVE HEAD ACCESSING MECHANISM

[75] Inventors: Frederick F. Quist, Jr.; Marc L. Steinbrecher, both of Boulder, Colo.

[73] Assignee: International Business Machines Corporation, Armonk, N.Y.

[21] Appl. No.: 439,147

[22] Filed: Nov. 4, 1982

[51] Int. Cl.⁴ .............................................. G11B 5/55
[52] U.S. Cl. .................................................. 360/106
[58] Field of Search ................... 360/75, 76, 97, 98, 360/99, 104, 105, 106, 107, 108, 109; 356/138; 33/281, 285

[56] References Cited

U.S. PATENT DOCUMENTS

| 3,384,880 | 5/1968 | Duinker et al. | 360/97 |
| 4,071,867 | 1/1978 | Pejcha | 360/109 |
| 4,097,908 | 6/1978 | Chou et al. | 360/76 |
| 4,164,769 | 8/1979 | Kaseta et al. | 360/106 |
| 4,481,543 | 11/1984 | Saito | 360/97 |

FOREIGN PATENT DOCUMENTS 56-127920 7/1981 Japan .

*Primary Examiner*—John H. Wolff
*Attorney, Agent, or Firm*—Francis A. Sirr

[57] ABSTRACT

A flexible disk drive in which the head moves in an arc, as the head is selectively moved to access the data at the various concentric data tracks of a disk. Concomitant with this approximate arcuate movement, the head is azimuth-rotated, such that its gap has a predefined, optimum azimuth orientation to each of the individual disk tracks, for example, the head's gap is normal to the track's center line at each head position.

4 Claims, 7 Drawing Figures

PATH OF 27

DISK DRIVE HEAD ACCESSING MECHANISM

DESCRIPTION

1. Technical Field

This invention relates to the field of dynamic magnetic information storage or retrieval by the use of a magnetic disk, for example a floppy disk; and more specifically to a head-moving arrangement which azimuth-rotates the head, as the head is moved to the various disk tracks.

2. Background of the Invention

Disk drives, be they rigid or floppy, provide generally two types of head accessing mechanism. In one type, the head moves along one of the disk radii, as the head is moved to the various disk tracks. In this case, the disk drive is initially manufactured so that its head-azimuth parameter is correct at one track, and it follows that azimuth position should not change as the head is moved along the disk's radius, to other tracks. U.S. Pat. No. 4,097,908 is exemplary.

In the second type, the head also moves generally radially, in order to access the various disk tracks; however, this movement is non-linear, and usually arcuate, such as on a segment of a circle. U.S. Pat. No. 4,071,867 is exemplary of this second type. In this second type, the head's azimuth attitude is usually factory-adjusted at one of the track positions, for example the middle track, and changes in azimuth are tolerated as the head moves toward the disk's inner or outer track.

SUMMARY OF THE INVENTION

The present invention relates to the second of the aforesaid arrangements. Namely, an arrangement where the head moves non-linear, as it moves generally radially of the disk.

An object of the present invention is to provide a head-movement construction and arrangement whereby the head is concomitantly azimuth-rotated and radially-moved, so that the head's azimuth attitude is optimum for each of the disk's individual data tracks. One such optimum position is with the head's read/write gap normal to a line which is tangent to the track center line, at the point where this center line intersects the middle of the head gap. Others may choose a different optimum position, and the present invention is not to be limited to a specific azimuth position.

The foregoing and other features and advantages of the invention will be apparent from the following more particular description of preferred embodiments of the invention, as illustrated in the accompanying drawing.

DESCRIPTION OF THE PREFERRED EMBODIMENTS

Figure 1:
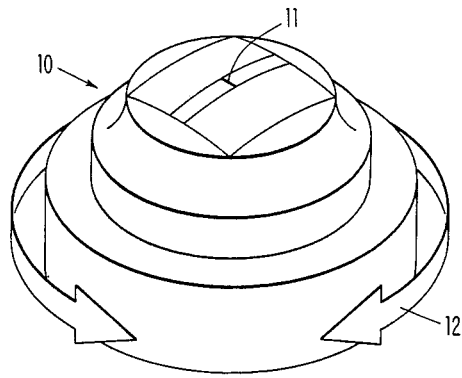
FIG. 1 shows a typical head button, its upward-facing transducing gap, and an arrow defining azimuth rotation as the term is used herein.

FIG. 1 is presented in order to define the term azimuth movement, as it is used herein. FIG. 1 shows a head button 10 of the type which is firmly attached, as by using glue, to the head movement mechanism of the present invention. This head includes a linear gap 11 which should be positioned generally at the disk's data-track center line, and be normal thereto. Azimuth rotation of head 10, as defined by arrow 12, produces the desired angularity between head gap 11 and the center line of the disk's data track. Within the scope of the present invention, this may be normal to the center line, or at another desired angle to the center line, as desired.

Azimuth rotation 12 occurs in a plane which is parallel to the spin-plane of the magnetic recording disk whose data track is being transduced by gap 11. Gap 11 may be spaced from the disk's surface by a very small distance, or may actually penetrate the disk's spin plane for the purpose of in-contact read/write of the disk's data track.

Figure 2:
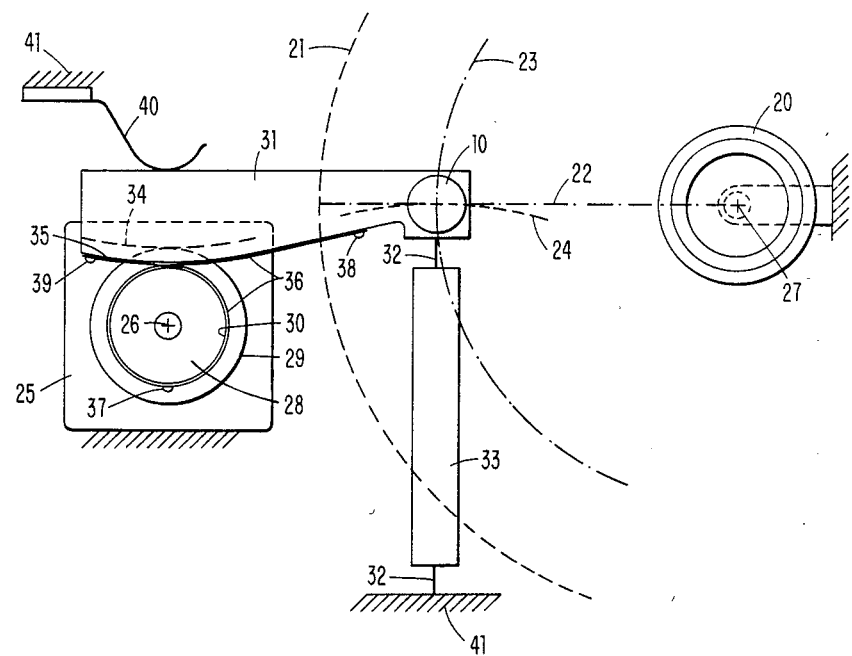
FIG. 2 is a first embodiment of the present invention.

FIG. 2 is a top view of a first embodiment of the present invention, this view being in a plane parallel to the disk's spin plane. In this view, the disk is clamped to disk drive spindle 20. The disk's circular boundary is represented by dotted line 21. A disk radius is represented by line 22. Head 10 is positioned to read or write disk track 23, which for example may be "track 23". The head's arcuate head path is represented by line 24. The radially-opposite ends of line 24 represent the head's position when the head is positioned to the disk's inner and outer data tracks. As can be seen, head 10 resides on disk radius 22 only when the head is positioned at "track 23". At all other track positions, the head lies on another disk radius.

The present invention produces a desired head azimuth attitude for all data tracks, for example, the same azimuth attitude for all tracks. In the FIGS. 2–4 embodiment, this is accomplished by the use of cam surfaces. In the FIG. 5 embodiment, this is accomplished by a four-bar linkage. Obviously, the cam embodiment gives one more freedom in tailoring the azimuth attitude across all tracks.

In FIG. 2, a stepper motor 25 bidirectionally rotates pulley 28 about an axis 26 which is parallel to the spin axis 27 of spindle 20. Pulley 28 includes a cam engaging surface 29 and a cylinder 30 for mounting a band 36.

Head 10 is non-movably mounted to head carriage member 31. The right-hand end of carriage 31 is pivotally supported on metal leaf spring 32 whose extended midportion is stiffened by an encasing plastic block 33. Carriage 31 contains cam 34 which engages surface 29 of pulley 28 to provide azimuth control, and cam 35 which may be used to deflect band 36 (i.e., cause the band to wrap a raised portion of cam surface 35), to provide radial error correction, when motor 25 is in fact a stepping motor. In this way, cam 34 controls azimuth, and cam 35 controls radial position at the various disk tracks.

A metal band 36 encircles cylinder 30. A midportion 37 of the band is attached to surface 30. The two opposite ends of band 36 are attached to cam surface 35 at points 38 and 39. One end of band 36 is wider than the other, and the wide end is formed with an extending slot through which the other narrow end of band 36 passes, thus facilitating the wrapped condition shown in FIG. 2.

Band 36 operates to hold cam surface 34 in engagement with the cooperating surface 29 of pulley 28. It is possible to provide a metal spring 40 to aid in this function.

As will be readily appreciated, clockwise rotation of pulley 28 causes head 10 to move radially inward, along line 24, to the disk's inner tracks; whereas, counterclockwise rotation of pulley 28 causes head to move radially outward, to the disk's outer tracks. Cams 34 and 35 (only one of which is necessary) operate to produce azimuth rotation and radial position of head 10 during this movement.

More specifically, starting from the mid-track position shown in FIG. 2, head 10 azimuth rotates generally counterclockwise as the head moves inward of the disk, and rotates generally counterclockwise as the head moves outward of the disk.

In FIG. 2, the head's path 24, relative the disk drive's frame (represented by ground points 41 and spin axes 26 and 27) is approximately an arc. However, the azimuth position of the head, relative a radial from the disk center to the head gap 11, is virtually the same for all head positions. Radial movement of the head is controlled by rotation of the stepper motor. The head carriage, and its cams 34 and 35, control the azimuth position of the head, in addition to transmitting radial motion to the head.

This arrangement provides a simple, low cost, equivalent of the linear-carriage-movement head accessing mechanisms, such as shown in aforesaid U.S. Pat. No. 4,097,908; and yet, a low inertia, low friction arrangement is provided, thus facilitating fast track-to-track access time.

While the invention has been shown in a single-sided disk environment, the invention is readily usable in a disk drive having dual sided recording.

Figure 3:
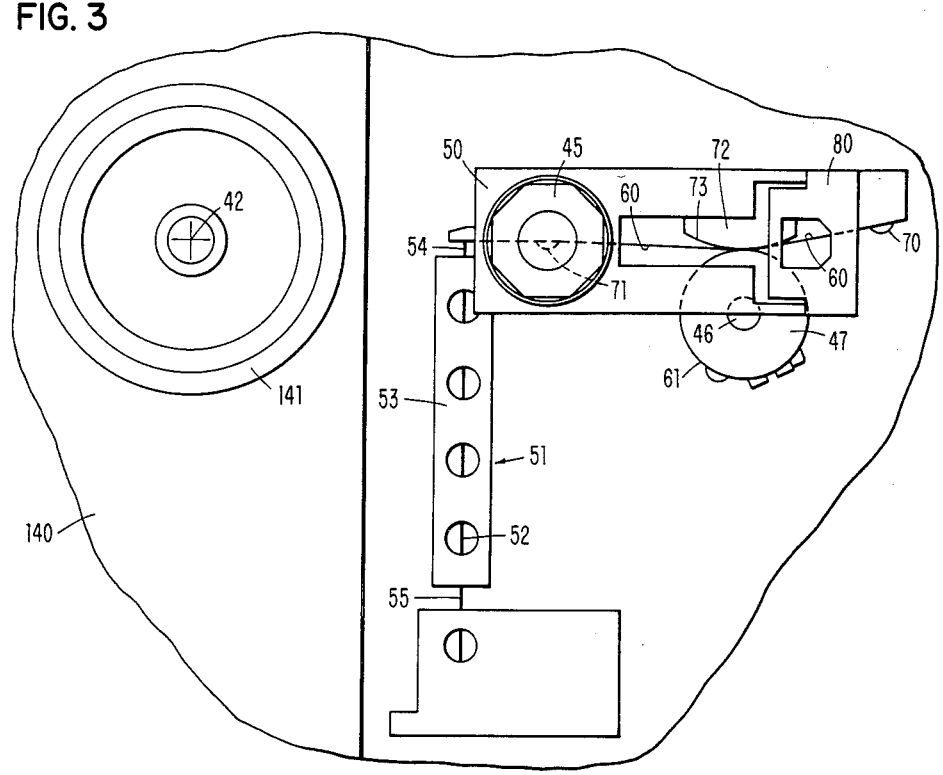
FIGS. 3 and 4 show a 5¼-inch floppy disk drive including the present invention.
Figure 4:
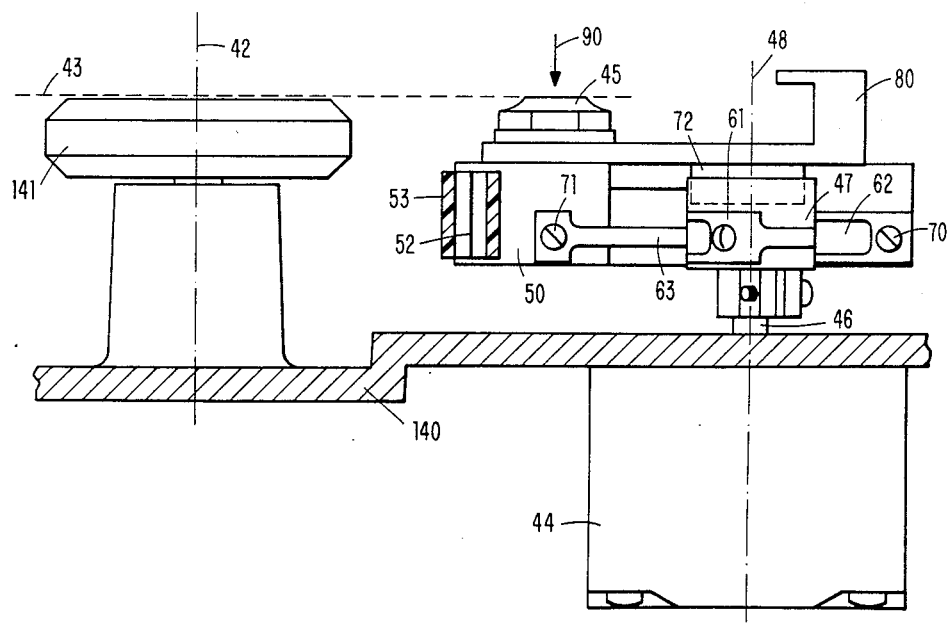

FIGS. 3 and 4 are top and side views, respectively, of a 5¼-inch floppy disk drive incorporating the present invention.

In FIG. 4, the side view, the disk drive's metal frame 140 supports spindle 141. This spindle establishes the floppy disk's spin axis 42 and spin plane 43. Stepper motor 44, which is effective to move head 45 to a desired data-track location, is mounted below frame 140, and its output shaft 46 supports pulley 47 above frame 140. Pulley 47 rotates on axis 48. Axes 42 and 48 are parallel, and are normal to spin-plane 43.

Head 45 is carried by plastic head carriage member 50. The left-hand end of carriage 50 is supported by link 51, which comprises a metal leaf spring 52 encased in a plastic block 53. Block 53 serves to stiffen spring 52 so as to provide two pivot points 54 and 55.

The right-hand end of carriage 50 is supported by metal drive band 60. As seen in FIG. 4, this band has its midportion 61 bolted to pulley 47. One end of band 60 includes an elongated opening 62 which receives the other, narrow end 63 of the band in noninterfering fashion. In this manner, band 60 wraps approximately 360° around pulley 47. The two ends of band 60 are then attached to carriage 50 at locations 70 and 71.

Carriage 50 includes a cam member 72 (FIG. 3) whose cam surface 73 makes line-contact to the cylindrical surface of pulley 47. The outer surface of pulley 47 defines a circular cylinder whose axis is coincident with axis 48. Cam surface 73 makes line-contact to this cylinder, this line-contact being normal to spin-plane 43.

As pulley 47 rotates clockwise (FIG. 3), head 45 moves toward the outer circular boundary of the disk (not shown), and the head is azimuth-rotated generally clockwise. As pulley 47 rotates counterclockwise, the head moves toward spindle 141, and the head is azimuth-rotated generally clockwise. The azimuth rotation profile of head 45, as a function of the position of pulley 47, is established by the profile of cam surface 73. It is within the present invention to establish its relationship by means of the construction and arrangement of one or both of cam surface 73 and/or the external surface of pulley 47.

Carriage 50 includes an upwardly extending arm 80 which is adapted to support either a second head, or a head-pad. In either event, once a disk occupies spin-plane 43, the second head, or the pad, is moved down on top of the other side of the disk, so as to trap the disk against head 45. This function is represented in FIG. 4 by arrow 90.

Figure 5:
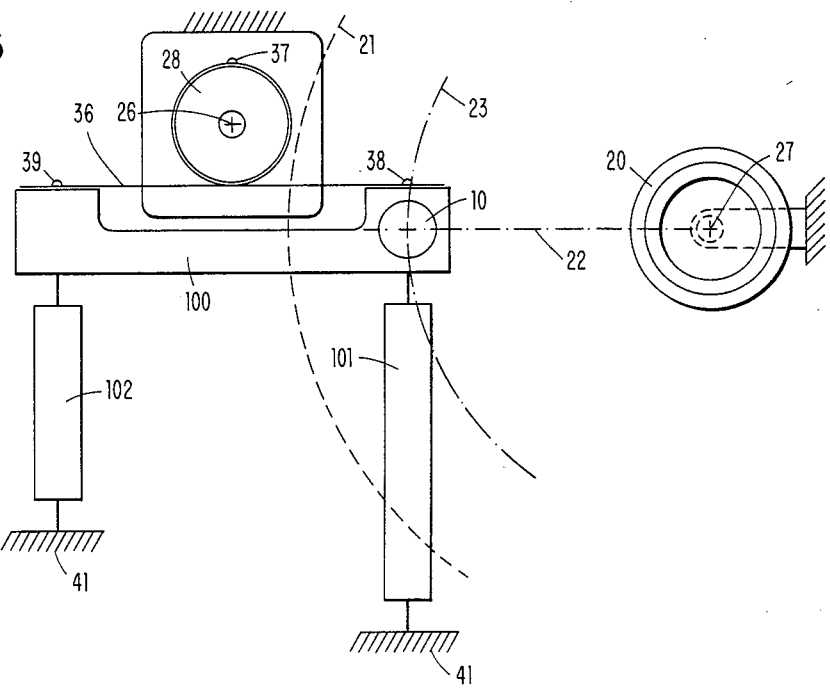
FIG. 5 is a further embodiment of the present invention.

FIG. 5 shows a further embodiment of the present invention. In this figure, similar structure to FIG. 2 has been given an identical reference numeral.

In FIG. 5, head carriage 100 is supported by two unequal length, flexible arms 101 and 102, each of which comprise a metal spring having its major central portion encased in a plastic stiffening block. Again, metal band 36 wraps motor pulley 28, attaches to the pulley at 37, and to the head carriage at 38 and 39. Thus, clockwise rotation of pulley 28 causes head 10 to move radially outward of the disk; and counterclockwise rotation causes head 10 to move radially inward of the disk.

Due to the unequal length of arms 101 and 102, head 10 azimuth-rotates generally counterclockwise during the aforesaid inward movement; and generally counterclockwise during the aforesaid outward movement of the head. Another embodiment, like FIG. 5, would be to provide equal length arms 101 and 102, but to space the points of attachment 41 a greater or a lesser distance apart than the points of attachment to carriage 100.

Figure 6:
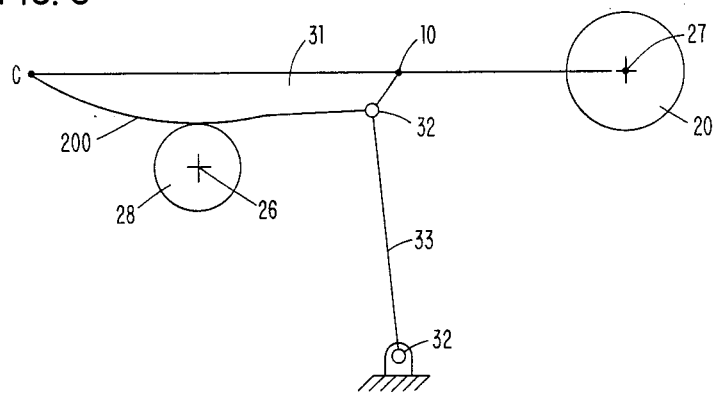
FIGS. 6 and 7 are a kinematic model, and its inversion, respectively, of the arrangement of FIG. 2.
Figure 7:
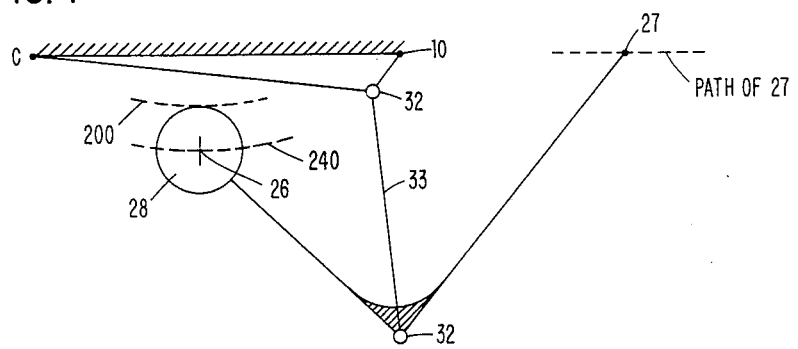

Various means for determining structural configurations which will satisfy the teachings of the present invention will be apparent to those skilled in the art. However, as an aid, FIGS. 6 and 7 are presented as an example of the method used to design a system compatible with drives exemplary of U.S. Pat. No. 4,097,908 (i.e., those with linear carriage motion). Those skilled in the art will, however, be readily able to apply the following techniques to drives having nonlinear carriage motion.

FIG. 6 is a schematic representation of the means of FIG. 2. In this representation point C is any reference point on member 31 which is on a line drawn from the center of head gap 11 (FIG. 1) through the spindle's spin axis 27. Link 33 is shown as a line, and its two pivot points 32 are shown.

FIG. 7 is the kinematic inversion of FIG. 6. That is, FIG. 6's fixed points 26,32 (the lower one) and 27 are movable in FIG. 7; and FIG. 6's movable points C,10 and 32 (the upper one) are fixed in FIG. 7. In both figures the gap of head 10 is colinear with line C,10,27, and the head is located at point 10. In addition, line C,10,27 lies on a radial of disk 21.

In order to calculate the shape of cam surface 200, movable line C,10,27 in FIG. 6 must always coincide with a radial of the disk which passes through the center of the head gap. In other words, line C,10,27 pivots about fixed point 27 (FIG. 6). Likewise, the movable point 27 in FIG. 7 must always lie on the fixed line established by points C,10.

From this requirement, the locus of point 26, curve 240, is determined and, knowing the radius of circular-cylinder pulley surface 28, the cam profile 200 can be calculated.

While the invention has been particularly shown and described with reference to preferred embodiments thereof, it will be understood by those skilled in the art that various changes in form and details may be made therein without departing from the spirit and scope of the invention.

What is claimed is:

1. A disk drive, comprising:
   a planar disk which spins about a fixed-position axis, and carries a multiplicity of concentric data tracks;
   a magnetic head which moves generally along one disk radius, as the head is selectively positioned to transduce one of the disk's data tracks, said head movement being along an arc which crosses said one radius at least once;
   a head carriage upon which said head is mounted;
   a fixed-length, pivoting link having one end pivotally mounted on said disk drive, and the other end pivotally supporting one portion of said head carriage;
   a rotatable pulley means drivingly engaging a spaced cam means portion of said head carriage, and operable to cause said head carriage to move generally along said radius and thereby rotate about the point of its attachment to said other end of said pivoted link as said pulley means rotates, to thereby radially move said head to a selected track position, and to concomitantly produce azimuth rotation of said head about an axis parallel to the disk's spin axis, thereby producing generally the same azimuth attitude of said head at each of said data tracks; and
   movement means operable to produce concomitant rotation of said pulley means and generally radial movement of said head carriage.

2. The disk drive of claim 1 wherein said movement means comprises a drive band whose end points are attached to spaced portions of said head carriage, and whose midportion is attached to said pulley means, said band also serving to hold said head carriage against said cam.

3. The disk drive of claim 2 wherein said movement means includes a rotary stepper motor means mounted to produce step rotation of said pulley means.

4. The disk drive of claim 3 wherein said head carriage includes an additional cam means cooperating with said drive band, and operable to control radial movement of said head such that equally-radially-spaced data tracks on the disk are accurately accessed by stepping of said stepper motor.

* * * * *